United States Patent [19]

Ostrup et al.

[11] Patent Number: 4,869,058
[45] Date of Patent: Sep. 26, 1989

[54] SELF-PROPELLING AGRICULTURAL MACHINE

[75] Inventors: Heinrich Ostrup; Günter Eis, both of Harsewinkel, Fed. Rep. of Germany

[73] Assignee: Claas Ohg, Harsewinkel, Fed. Rep. of Germany

[21] Appl. No.: 239,703

[22] Filed: Aug. 31, 1988

[30] Foreign Application Priority Data

Sep. 18, 1987 [DE] Fed. Rep. of Germany ....... 3731420

[51] Int. Cl.⁴ ............................................. A01D 67/00
[52] U.S. Cl. ........................................ 56/208; 56/209; 172/668
[58] Field of Search .................................. 56/208–217, 56/15.6, 15.8, 16.2; 172/663, 667, 668

[56] References Cited

U.S. PATENT DOCUMENTS 4,313,294  2/1982  Martenas ........................... 56/208 X
4,527,381  7/1985  Mann ................................... 56/209
4,759,173  7/1988  Ostrupet et al. ...................... 56/208

FOREIGN PATENT DOCUMENTS 3522699  4/1987  Fed. Rep. of Germany .

Primary Examiner—Thuy M. Bui
Attorney, Agent, or Firm—Michael J. Striker

[57] ABSTRACT

A self-propelling agricultural machine, especially a self-propelling harvester thresher comprises a machine part having a front side, a working implement mounted on the front side of the machine part and turnable in a direction which is transverse to a travelling direction, and a unit for mounting the working implement on the machine part and including two cylinder-piston units having pistons with piston rods which are connected with the working implement and also having cylinders which are connected with the machine part, the connecting unit also having a switching valve, the cylinders of the cylinder-piston units having piston-side chambers which are connected with one another and piston rod-side chambers which are individually connected to the switching valve.

9 Claims, 1 Drawing Sheet

U.S. Patent  Sep. 26, 1989  4,869,058
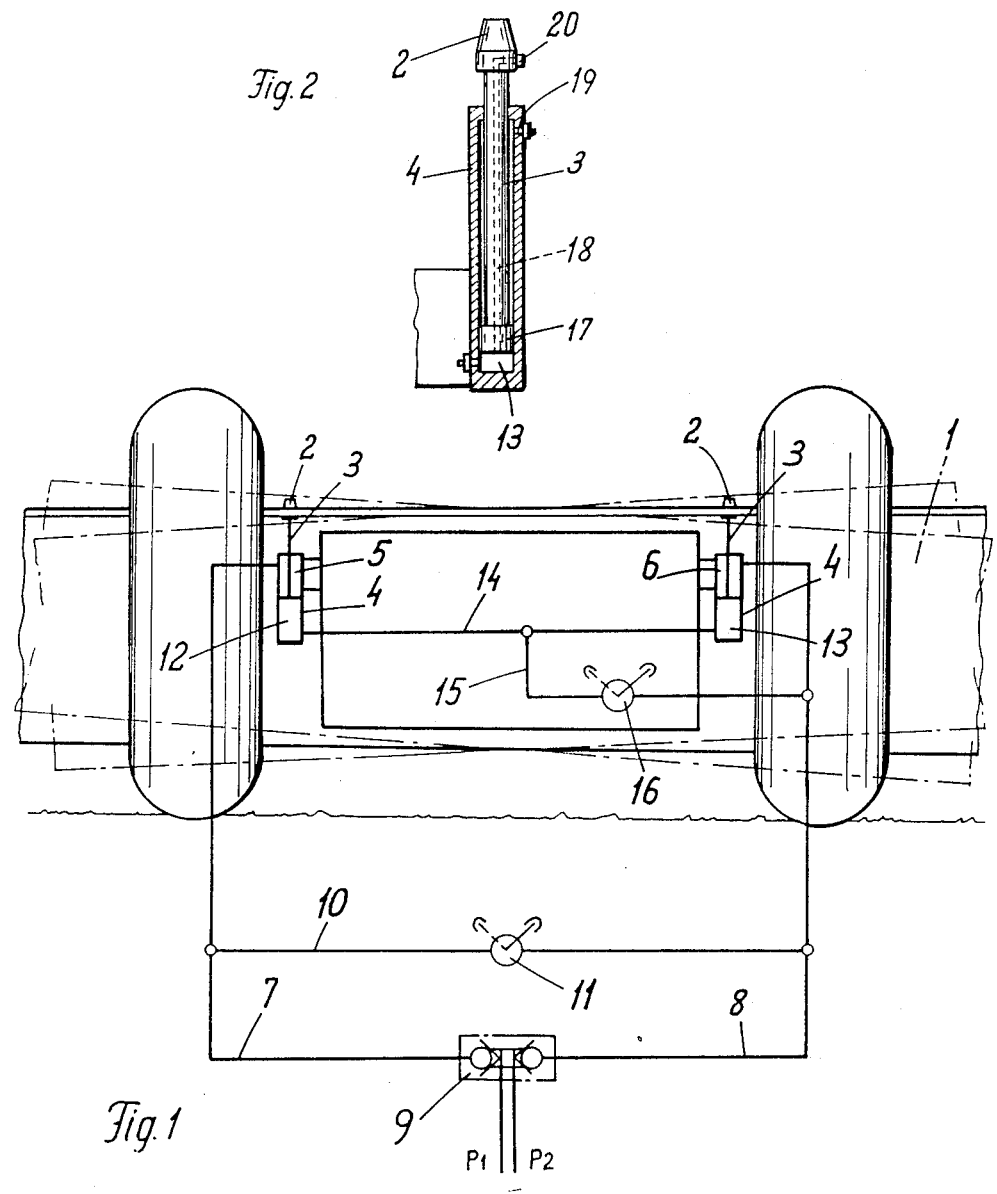

SELF-PROPELLING AGRICULTURAL MACHINE

BACKGROUND OF THE INVENTION

The present invention relates to a self-propelling agricultural machine.

More particularly, it relates to a self-propelling agricultural machine such as, for example, a harvester thresher provided with a front working implement for example a cutting table which is turnable transversely to a travelling direction. The working implement can be connected with the agricultural machine by means of receiving openings and supporting pins which are mounted on ends of piston rods of cylinder-piston units, while cylinders of the cylinder-piston units are connected with the agricultural machine.

An agricultural machine of the above mentioned general type is disclosed for example in the German document DE-OS No. 3,522,699. It operates in a satisfactory manner for adjusting the cutting mechanism to a ground contour. It has been however shown in practice that depending on the inclined position of the cutting mechanism, the center of gravity of the harvester thresher changes, which unfavorably affects the travelling condition. Moreover, in the turning position the transfer cross-section on a channel side between the cutting table and the inclined conveyor channel reduces so that it can lead to operational disturbances.

SUMMARY OF THE INVENTION

Accordingly, it is an object of the present invention to provide an agricultural machine of the abovementioned general type, which avoids the disadvantages of the prior art.

More particularly, it is an object of the present invention to provide an agricultural machine of the abovementioned general type which is formed so that the cutting mechanism can be turned in a simple manner, without a complicated construction utilized in a known machine, about an ideal central longitudinal axis.

In keeping with these objects and with others which will become apparent hereinafter, one feature of the present invention resides, briefly stated, in that piston-side chambers of the cylinder-piston units are connected with one another through a connecting conduit, while piston rods-side chambers of the cylinders of the cylinder-piston units are individually connected through individual conduits with a switching valve.

When the agricultural machine is designed in accordance with the present invention it has the advantage that the center of gravity of the cutting mechanism remains always the same relative to the harvester thresher, and in addition uniform force condition is provided in each turning position so that alternating loads are eliminated. At the same time the reduction of the transfer cross-section between the cutting table and the inclined conveyor channel is reduced to a minimum.

The individual conduits which connect the piston rod side chambers of the cylinders with the switching valve can be connected with a locking block. They can also be connected with one another through a bypass conduit which accommodates a short-circuit valve.

The connecting conduit which connects the piston-side chambers can be connected through an auxiliary conduit and a filling valve with one of the individual conduits.

Finally, the piston rod of each cylinder-piston unit can be provided with an opening which has one end located in the piston-side chamber of the cylinder and another end merging into a closeable transverse opening which is located outside the cylinder in the retracted position of the piston rod of a respective one of the cylinder-piston units.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a view showing a part of an agricultural machine in accordance with the present invention; and FIG. 2 is a view showing a section of one of the cylinder-piston units for connecting a working implement to a machine part of the agricultural machine in accordance with the present invention.

DESCRIPTION OF A PREFERRED EMBODIMENT

A self-propelling harvester thresher has a cutting mechanism which is identified with reference numeral 1. The cutting mechanism is suspended on supporting pins 2. Two cylinder-piston units are further provided. Each cylinder-piston unit has a piston with a piston rod 3 which is fixedly connected with a respective one of the supporting pins 2, and a cylinder 4 which is mounted in a not shown manner on the harvester thresher.

As can be seen from FIG. 1, one of the piston rod-side chambers of each of the cylinders 4, namely the chambers 5 and 6, are connected through conduits 7 and 8 with a locking block 9. The locking block 9, in turn, is in communication with a not shown 4/3-way valve of the hydraulic system of the harvester thresher. The locking block 9 closes and hinders the oil column which can pull out the piston rods. For bypassing the locking block 9, a bypass conduit 10 is provided. This bypass conduit 10 accommodates a short-circuit valve 11 and connects the conduits 7 and 8 with one another.

In order to insure that the cutting mechanism 1 can be limited to an ideal longitudinal central axis, opposite piston-side chambers 12 and 13 of the cylinder 4 are permanently connected with one another through a conduit 14. The conduit 14 is connected through an auxiliary conduit 15 with a conduit 8 which leads to the locking block 9. After opening of a filling valve 16, oil can flow from the conduit 8 into the conduit 14.

One of the cylinder-piston units are shown in FIG. 2. It has a cylinder 4, in which a piston 17 with a piston rod 3 are guided. The piston-side chamber 13 is in communication through an opening 18 with the transverse opening 19. In the retracted position of the piston 17 the transverse opening 19 is located above the cylinder 4 and closed with a ventilating screw 20.

When the cutting mechanism 1 must be moved to its inclined position, pressure oil is supplied for example through the conduit 7 to the piston rod-side chamber 5 of the left cylinder-piston unit so that its piston rod 3 is retracted. The oil is expelled from the piston-side chamber 12 and flows through the conduit 14 to the piston-side chamber 13 of the right cylinder-piston unit. In this way the piston rod 3 of the right cylinder-piston unit is retracted by exactly the same value as is the piston rod 3 of the left cylinder-piston unit. The cutting mechanism 1 is therefore always limited to an imaginary longitudinal central axis, and in each turning position obtains a stable position of its center of gravity which is very important for travelling condition.

In the event of uneven terrains a driver of the harvester thresher can open the valve 11 so as to lower the cutting mechanism to the ground. Since both conduits 7 and 8 are connected with one another, the cutting mechanism 1 can exactly adapt to the inclined position of the ground. After this, the valve 11 is closed and the cutting mechanism is lifted parallel to the ground by a desired value.

For filling the whole system shown in FIG. 1, the ventilating screw 20 of both cylinder-piston units and also the filling valve 16 are opened. Pressure oil is supplied to the conduit 8 through a not shown 4/3-way valve of the hydraulic system of the harvester thresher and through the locking block 9, so that the pressure oil rises in the piston-rod side chamber 6 of the right cylinder-piston unit and in the piston-side chambers 12 and 13 of both cylinders.

The piston-rod side chamber 5 of the left cylinder-piston unit is connected through the locking block 9 with a tank. Then both piston rods 3 are extended and the cylinder-piston units are filled with oil. The entrapped oil escapes through the ventilating screws 20. Then the ventilating screws 20 of both piston rods are closed. Finally, through the 4/3-way valve the pressure is applied through the locking block 9 to the left side. The piston rod of the left cylinder-piston unit is retracted and expels the piston end oil through the filling valve 16 and the locking block 9 to the tank. After this the filling valve 16 is closed. By actuating the 4/3-way valve of the hydraulic system in one or another direction, the piston-rod side of the right and left cylinder-piston units are provided with pressure, whereby the piston rod of the cylinder-piston unit is retracted. Thereby it expels the oil on the piston-side, and the oil flows to the piston-side of the other cylinder-piston unit so that the piston rod in the other cylinder-piston unit is extended.

It will be understood that each of the elements described above, or two or more together, may also find a useful application in other types of constructions differing from the types described above.

While the invention has been illustrated and described as embodied in a self-propelling agricultural machine, in particular a harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A self-propelling agricultural machine, especially a self-propelling harvester thresher, comprising a machine part having a front side; a working implement mounted on said front side of said machine part and turnable in a direction which is transverse to a travelling direction; and means for mounting said working implement on said machine part and including two cylinder-piston units having pistons with piston rods which are connected with said working implement and also having cylinders which are connected with said machine part, said connecting means also having a switching valve, said cylinders of said cylinder-piston units having piston-side chambers which are connected with one another and piston rod-side chambers which are individually connected to said switching valve.

2. A self-propelling agricultural machine as defined in claim 1, wherein said working implement is a cutting table.

3. A self-propelling agricultural machine as defined in claim 1; and further comprising a connecting conduit which connects said piston-side chambers of said cylinders of said cylinder-piston units with one another.

4. A self-propelling agricultural machine as defined in claim 1; and further comprising individual conduits which individually connect said piston rod-side chambers of said cylinder of said cylinder-piston units with said switching valve.

5. A self-propelling agricultural machine as defined in claim 4; and further comprising a locking block which is in a working connection with said switching valve, said individual conduits being connected with said locking block.

6. A self-propelling agricultural machine as defined in claim 5; and further comprising a bypass conduit connecting said individual conduits with one another, and a short-circuit valve arranged in said bypass conduit.

7. A self-propelling agricultural machine as defined in claim 1; and further comprising a connecting conduit which connects said piston-side chambers of said cylinders of said cylinder-piston units with one another; individual conduits which individually connect said piston rod-side chambers of said cylinders of said cylinder-piston units with said switching valve; an auxiliary conduit; and a ventilating valve, said connecting conduit which connects said piston-side chambers being connected through said auxiliary conduit and said ventilating valve with one of said individual conduits.

8. A self-propelling agricultural machine as defined in claim 1, wherein said piston rod of each of said cylinder-piston units has an elongated opening with one end extending into said piston-side chamber and another end located outside of said cylinder in a retracted position of said piston rod of a respective one of said cylinder-piston units.

9. A self-propelling agricultural machine as defined in claim 8, wherein said piston rod has a closeable transverse opening into which said other end of said elongated opening opens.

* * * * *